United States Patent
Bavand et al.

(10) Patent No.: US 10,206,066 B1
(45) Date of Patent: Feb. 12, 2019

(54) METHOD AND SYSTEM FOR SERVER BASED MOBILE DEVICE MONITORING IN CROWD-SOURCED PEDESTRIAN LOCALIZATION

(71) Applicant: MAPSTED CORP., Mississauga, OT (CA)

(72) Inventors: Majid Bavand, Toronto (CA); Sean Huberman, Guelph (CA); Eros Gulo, Vaughan (CA); Paramvir Singh Nagpal, Markham (CA)

(73) Assignee: MAPSTED CORP., Mississauga, Ontario (CA)

( * ) Notice: Subject to any disclaimer, the term of this patent is extended or adjusted under 35 U.S.C. 154(b) by 0 days.

(21) Appl. No.: 15/928,182

(22) Filed: Mar. 22, 2018

(51) Int. Cl.
*H04W 4/80* (2018.01)
*G01C 21/20* (2006.01)
*H04W 4/024* (2018.01)

(52) U.S. Cl.
CPC .......... *H04W 4/024* (2018.02); *G01C 21/206* (2013.01); *H04W 4/80* (2018.02)

(58) Field of Classification Search
CPC ............................ H04W 4/024; G01C 21/206
See application file for complete search history.

(56) References Cited

U.S. PATENT DOCUMENTS

| | | | |
|---|---|---|---|
| 2006/0075131 A1* | 4/2006 | Douglas | G01S 5/0252 709/230 |
| 2009/0043504 A1 | 2/2009 | Bandyopadhyay et al. | |
| 2013/0033999 A1* | 2/2013 | Siomina | G01S 5/0236 370/252 |
| 2013/0342399 A1* | 12/2013 | Fukuda | G01S 1/02 342/386 |
| 2016/0295376 A1 | 10/2016 | Geng et al. | |
| 2016/0379074 A1 | 12/2016 | Nielsen et al. | |
| 2017/0339526 A9 | 11/2017 | Narasimha et al. | |
| 2018/0103392 A1 | 4/2018 | Emmanuel et al. | |

* cited by examiner

*Primary Examiner* — David Orange
(74) *Attorney, Agent, or Firm* — Henry L. Ohab

(57) ABSTRACT

A method and system of adjusting a radio frequency (RF) broadcast signal power level in a crowd-sourced mobile device localization system in a pedestrian area. The method is executed in the processor of a server computing device and comprises localizing a first and at least a second mobile devices to establish respective first and at least second estimated positions within the pedestrian area in accordance with fingerprint data of the pedestrian area, the first and the at least a second mobile devices broadcasting a respective localization data packet that includes the respective first and at least a second estimated positions at a first and an at least a second broadcast power levels respectively, determining a respective confidence level indicative of a degree of accuracy for the first and the at least a second estimated positions, and when the respective confidence level for at least one of the first estimated position and the at least a second estimated position is one of above and below a threshold confidence level, perform at least one of lowering and increasing at least one of the first broadcast power level and the at least a second broadcast power level.

20 Claims, 3 Drawing Sheets

300

310 Localizing a first and at least a second mobile devices to establish respective first and at least a second estimated positions within a pedestrian area based upon fingerprint data, the mobile devices broadcasting respective localization data packets that includes the estimated positions at a first and an at least a second broadcast power levels respectively

320 Determining a respective confidence level indicative of a degree of accuracy for the first and the at least a second estimated positions

330 When the respective confidence level for at least one of the first estimated position and the at least a second estimated position is one of above and below a threshold confidence level, perform at least one of lowering and increasing at least one of the first broadcast power level and the at least a second broadcast power level

FIG. 3

METHOD AND SYSTEM FOR SERVER BASED MOBILE DEVICE MONITORING IN CROWD-SOURCED PEDESTRIAN LOCALIZATION

TECHNICAL FIELD

The disclosure herein relates to the field of mobile device indoor navigation and localization.

BACKGROUND

Users of mobile devices are increasingly using and depending upon indoor positioning and navigation applications and features. Seamless, accurate and dependable indoor positioning of a mobile device carried or worn by a user can be difficult to achieve using satellite-based navigation systems when the latter becomes unavailable, or only sporadically available and therefore unreliable, such as within enclosed, or partially enclosed, urban infrastructure and buildings, including hospitals, shopping malls, airports, university campuses and industrial warehouses. Pedestrian navigation or positioning solutions may rely on sensors including accelerometers, gyroscopes, and magnetometers that may be commonly included in mobile phones and other mobile computing devices, in conjunction with acquired wireless communication signal data and magnetic field data to localize pedestrian users in possession of such a mobile device.

BRIEF DESCRIPTION OF THE DRAWINGS

FIG. 3 illustrates an example embodiment of a method of monitoring and adjusting broadcast signal power levels in a crowd-sourced mobile devices localization system.

DETAILED DESCRIPTION

Figure 1:
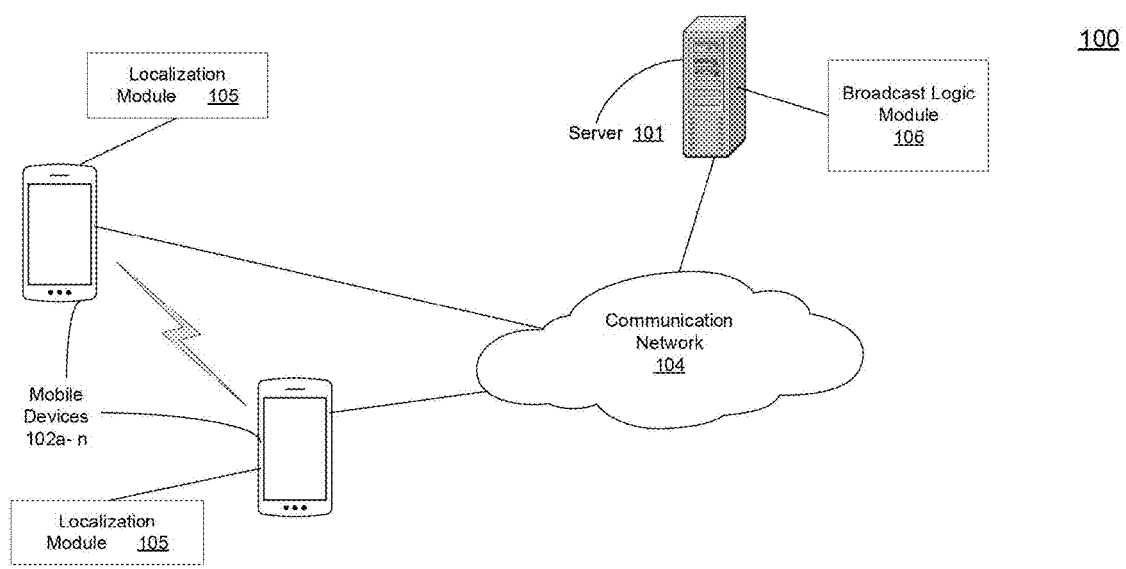
FIG. 1 illustrates, in an example embodiment, a server-based system for monitoring crowd-sourced localization of mobile devices.

Among other benefits and technical effect, embodiments provided herein allow monitoring and control of one or more mobile devices that can be localized with a high degree of accuracy to broadcast, via a wireless radio frequency (RF) signal, their estimated positions to peer mobile devices within a pedestrian area. Furthermore, a predetermined budget for overall or cumulative power level in transmission signals may set in conjunction a server computing device monitoring the group of peer mobile devices, and as one or more of the mobile devices are adjusted to transmit at higher or highest permitted power levels, one or more remaining others of mobile devices may be adjusted to lower or lowest transmission power levels notwithstanding the prevailing threshold confidence level. Managing a power level budget for a given crowd-sourced localization system including mobile devices in this manner enables the server device to control an amount of cumulative signal interference caused by the signal transmissions in total, with a view to enhancing the quality, clarity and range of selected mobile device signal transmissions locally for a given pedestrian area. The peer mobile devices that are in a generally known proximate range based on transmission range inherent to a given RF signal type, such as a Bluetooth Low Energy (BLE) signal type, from the broadcasting mobile device may optionally use the broadcasted position data, as received, to establish their respective positions, or to confirm their respective positions with an increased degree of certainty. More specifically, in such a crowd sourcing-based approach, users provided with, or carrying, an indoor positioning mobile device, may broadcast their known positions to other mobile devices within the crowd of peer mobile devices.

Provided is a method, executed at least partly in a processor of a server computing device, that comprises localizing a first and at least a second mobile devices to establish respective first and at least second estimated positions within the pedestrian area in accordance with fingerprint data of the pedestrian area, the first and the at least a second mobile devices broadcasting a respective localization data packet that includes the respective first and at least a second estimated positions at a first and an at least a second broadcast power levels respectively, determining a respective confidence level indicative of a degree of accuracy for the first and the at least a second estimated positions, and when the respective confidence level for at least one of the first estimated position and the at least a second estimated position is one of above and below a threshold confidence level, perform at least one of lowering and increasing at least one of the first broadcast power level and the at least a second broadcast power level.

In this manner, when the localization accuracy of a given broadcasting mobile device is high, then its broadcast RF power level is increased, resulting in a larger, more robust, broadcast range, especially as less accurately localized devices of the crowd of devices are relegated to broadcasting at a lower RF signal power. Advantageously, as the less accurate mobile devices of the crowd of mobile devices are quiesced in broadcasting power, those lower power RF signals propagating within the pedestrian area result in less signal interference to those mobile devices broadcasting at the higher power level, creating conditions more conducive to less noisy RF signal transmissions, which further helps to enhance localization accuracy of the latter devices.

The terms localize, or localization, as used herein refer to determining a unique coordinate position of the mobile device at a specific location along a pedestrian route being traversed relative to the indoor area or building. In some embodiments, localization may also include determining a floor within the building, and thus involve determining not only horizontal planar (x, y) coordinates, but also include a vertical, or z, coordinate of the mobile device, the latter embodying a floor number within a multi-floor building, for example. In other embodiments, the (x, y, z) coordinates may be expressed either in a local reference frame specific to the mobile device, or in accordance with a global coordinate reference frame.

The pedestrian area, in embodiments, may be an indoor area within any one of a shopping mall, a warehouse, an airport facility, a hospital facility, a university campus facility or any at least partially enclosed building. The term pedestrian as used herein is intended not encompass not only walking pedestrians, but also users of mobile phones moving at typical pedestrian speeds, for example at less than 10 miles per hour using automated means within the pedestrian area, including but not limited to automated wheelchairs or automated people-moving indoor carts.

A server computing device-based system for adjusting a radio frequency (RF) broadcast signal power level in a crowd-sourced mobile device localization system in a pedestrian area is also provided, The system comprises a processor and a memory. The memory includes instructions executable in the processor to localize a first and at least a second mobile devices to establish respective first and at least second estimated positions within the pedestrian area in accordance with fingerprint data of the pedestrian area, the first and the at least a second mobile devices broadcasting a respective localization data packet that includes the respective first and at least a second estimated positions at a first and an at least a second broadcast power levels respectively, determine a respective confidence level indicative of a degree of accuracy for the first and the at least a second estimated positions, and when the respective confidence level for at least one of the first estimated position and the at least a second estimated position is one of above and below a threshold confidence level, perform at least one of lowering and increasing at least one of the first broadcast power level and the at least a second broadcast power level.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

A mobile device as described herein may be implemented, in whole or in part, on mobile computing devices such as cellular or smartphones, laptop computers, wearable computer devices, and tablet devices. Memory, processing, and network resources may all be used in connection with the use and performance of embodiments described herein, including with the performance of any method or with the implementation of any system.

Furthermore, one or more embodiments described herein may be implemented through the use of logic instructions that are executable by one or more processors. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory (such as carried on smartphones). A mobile device as described herein utilizes processors, memory, and logic instructions stored on computer-readable medium. Embodiments described herein may be implemented in the form of computer processor-executable logic instructions or programs stored on computer memory mediums.

System Description

FIG. 1 illustrates, in an example embodiment, server-based system 100 for monitoring crowd-sourced localization of mobile devices within a pedestrian area. Mobile devices 102a-n may be such as a cellular or smartphone, a laptop or a tablet computer, or a wearable computer device that may be operational for any one or more of telephony, data communication, and data computing. As used herein, designation as mobile device 102 refers to any representative one of collective mobile devices 102a-n. Mobile device 102 may include fingerprint data of a surrounding or proximate pedestrian area stored in local memory. In other variations, mobile device 102 may be connected within a computer network communication system, including the internet or other wide area network, to one or more remote server computing device(s) storing the fingerprint data of the pedestrian area, the latter being communicatively accessible to mobile device 102 for download of the fingerprint data.

A pedestrian navigation, or indoor positioning, software application downloaded and installed, or stored, in a memory of mobile device 102 may render physical layout map of a facility or building of a pedestrian area within a user interface display of mobile device 102. In one embodiment, the pedestrian navigation software application may incorporate one or more portions of processor-executable instructions manifesting crowd-sourced localization logic module 105. The terms localize or localization as used herein refer to determining an estimated coordinate position (x, y, z) along a pedestrian route or trajectory being traversed in accompaniment of mobile device 102. The display of physical layout map may further show a trajectory or pedestrian route traversed by a user in possession of mobile device 102 within the pedestrian area.

Mobile device 102 may include sensor functionality by way of sensor devices. The sensor devices may include inertial sensors such as an accelerometer and a gyroscope, and magnetometer or other magnetic field sensing functionality, barometric or other ambient pressure sensing functionality, humidity sensor, thermometer, and ambient lighting sensors such as to detect ambient lighting intensity. Mobile device 102 may also include capability for detecting and communicatively accessing ambient wireless communication signals including but not limited to any of Bluetooth and Bluetooth Low Energy (BLE), Wi-Fi, RFID, and also satellite-based navigations signals including global positioning system (GPS) signals. Mobile device 102 further includes the capability for detecting, via sensor devices, and measuring a received signal strength, and of determining signal connectivity parameters, related to the ambient wireless signals. In particular, mobile device 102 may include location determination capability such as by way of a GPS module having a GPS receiver, and a communication interface for communicatively coupling to communication network 107, including by sending and receiving cellular data over data and voice channels.

A fingerprint data repository, or any portion(s) thereof, may be stored in remote computing server device 101, and made communicatively accessible to mobile device 102 via communication network 107. In some embodiments, it is contemplated that the fingerprint data repository, or any portions of data and processor-executable instructions constituting the fingerprint data repository, may be downloaded for storage, at least temporarily, within a memory of mobile device 102. In embodiments, the fingerprint map data stored in the fingerprint data repository further associates particular positions along pedestrian route of the facility or indoor area with any combination of fingerprint data, including gyroscope data, accelerometer data, wireless signal strength data, wireless connectivity data, magnetic data, barometric data, acoustic data, line-of sight data, and ambient lighting data stored thereon.

The terms fingerprint and fingerprint data as used herein refer to time-correlated, individual measurements of any of, or any combination of, received wireless communication signal strength and signal connectivity parameters, magnetic field parameters (strength, direction) or barometric pressure parameters, and mobile device inertial sensor data at known, particular locations along a route being traversed, and also anticipated for traversal, by the mobile device. In other words, a fingerprint as referred to herein may include a correlation of sensor and signal information (including, but not necessarily limited to wireless signal strength, wireless connectivity information, magnetic or barometric information, inertial sensor information and GPS location information) associated for a unique location relative to the facility. Thus, fingerprint data associated with a particular location or position may provide a fingerprint signature that uniquely correlates to that particular location or position. A sequence of positions or locations that constitute a navigation path traversed by the mobile device relative to a given indoor facility may be fingerprint-mapped during a calibration process, and the resulting fingerprint map stored in a fingerprint data repository of server 101. Server 101 may store respective fingerprint maps of various buildings and indoor areas. The respective building or indoor facility fingerprint maps, or any portions thereof, may be downloaded into a memory of mobile device 102 for use in conjunction with the pedestrian navigation software application executing thereon.

A particular fingerprint or signature based on any of received wireless communication signal strength and signal connectivity parameters, magnetic field parameters or barometric pressure parameters, and mobile device inertial sensor data may be detected or recorded by mobile device 102, whereupon the fingerprint or signature as detected may be matched to a reference fingerprint, or a reference pattern including a set of fingerprints, in a stored fingerprint map of a given facility made accessible to crowd-sourced localization logic module 105 to identify a unique position of mobile device 102 along a pedestrian route. As used herein, term signal connectivity, as distinguished from a signal strength, refers to a wireless radio frequency (RF) signal being available for use in bi-directional data communication, such as between devices that both transmit and receive data using that available wireless RF signal. In some embodiments, given that sampling times and sampling rates applied in conjunction with particular mobile device sensors may be different, the signal and sensor information as measured during the fingerprint calibration process may be time-averaged across particular periods of time, with the time-averaged value being used to represent the signal information at any given instance of time within that particular period of time in which the signal information is time-averaged. Fingerprint data may be used to track traversal of mobile device 102 along a sequence of positions that constitute a pedestrian route within, and even adjoining, the indoor facility.

Crowd-sourced localization logic module 105, constituted of logic instructions executable in a processor of mobile device 102 in one embodiment, may be hosted at mobile device 102 and provides, at least in part, capability for system localizing a mobile device along a pedestrian route traversed in an indoor area. In alternate embodiments, one or more portions constituting crowd-sourced localization logic module 105 may be hosted remotely at a server device and made communicatively accessible to mobile device 102 via communication network 107.

Figure 2:
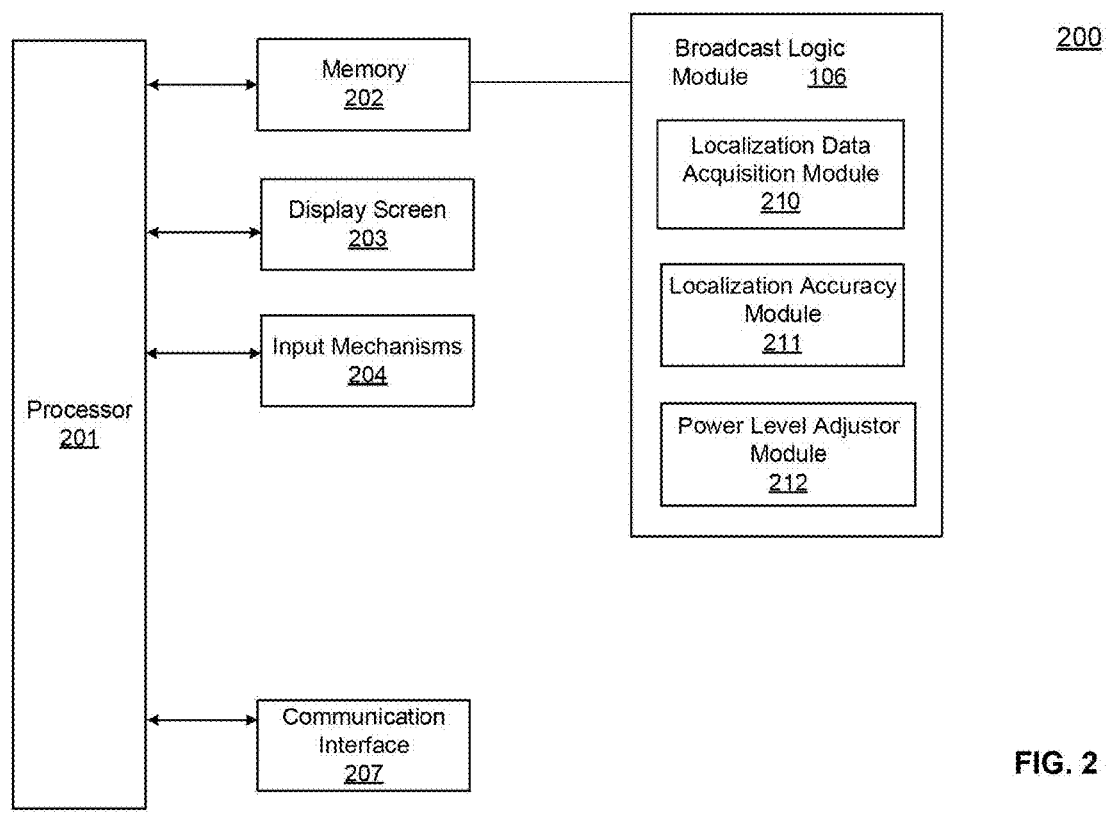
FIG. 2 illustrates, in one example embodiment, an architecture of a server computing device for monitoring a crowd-sourced mobile device localization system.

FIG. 2 illustrates an example embodiment 200 architecture of server computing device 101 for monitoring and adjusting signal broadcast power levels in mobile devices 102a-n. Server 101, in embodiment architecture 200, may be implemented on one or more server devices, and includes processor 201, memory 202 which may include a read-only memory (ROM) as well as a random access memory (RAM) or other dynamic storage device, display device 203, input mechanisms 204 and communication interface 207 communicatively coupled to communication network 104. Processor 201 is configured with software and/or other logic to perform one or more processes, steps and other functions described with implementations, such as described by FIGS. 1 through 3 herein. Processor 201 may process information and instructions stored in memory 202, such as provided by a random access memory (RAM) or other dynamic storage device, for storing information and instructions which are executable in processor 201. Memory 202 also may be used for storing temporary variables or other intermediate information during execution of instructions to be executed by processor 201. Memory 202 may also include the ROM or other static storage device for storing static information and instructions for processor 201; a storage device, such as a magnetic disk or optical disk, may be provided for storing information and instructions. Communication interface 207 enables server 101 to communicate with one or more communication networks 104 (e.g., a cellular network) through use of the both wired and wireless network links. Using the network link, server 101 can communicate with mobile computing devices 102a-n.

Mobile devices 102a-n may incorporate sensor functionality by way of sensor devices including inertial sensors such as an accelerometer and a gyroscope, and magnetometer or other magnetic field sensing functionality, barometric or other ambient pressure sensing functionality, and ambient lighting sensors, such as to detect ambient lighting intensity. Mobile devices 102a-n may also include capability for both transmitting and detecting, ambient wireless communication signals including but not limited to any of Bluetooth and Bluetooth Low Energy (BLE), Wi-Fi, RFID, and also satellite-based navigations signals such as, but not limited to, global positioning system (GPS) signals. For example, a BLE signal packet may typically include identifiers that are advertised publicly, whereby any other mobile device that can detect the BLE signals as transmitted or broadcast will be able to capture these identifiers. Mobile device 102 may, in this manner, be equipped with, and include capability for detecting, via sensor devices 205, and measuring a received signal strength, and for determining signal connectivity parameters, related to the ambient wireless radio frequency (RF) signals.

Crowd-sourced localization logic module 105 of mobile device 102 includes instructions stored in memory 202 of mobile device 102, executable in a processor of mobile device 102. In alternate embodiments, it is contemplated that any one or more or portions of crowd-sourced localization logic module 105 may be located at remote server device 101 communicatively accessible to mobile devices 102a-n via network communication interface 207.

Processor 201 uses executable instructions of localization data acquisition module 210 to acquire localization data of mobile devices 102a-n, as localized within the pedestrian area based on using fingerprint data of the pedestrian area. In other variations, localization of at least some of mobile devices 102a-n may be performed at server 101 based on sensor and wireless signal data as acquired at the respective ones of mobile devices 102a-n and communicated to server 101 via communication network 104.

Each of mobile devices 102a-n may broadcast, or transmit, at a given broadcast RF signal power level, a localization data packet that includes data of its estimated position to one or more peer mobile devices 102a-n within the pedestrian area. The broadcasting power level may be measured in dBM (Decibel-milliwatts) and the higher the broadcast power level, the higher the RF signal strength, in one embodiment a Bluetooth Low Energy (BLE) signal, which results in signal broadcast having a greater range.

Processor 201 uses executable instructions stored in localization accuracy module 211 to determine a confidence level indicative of a degree of accuracy for the estimated position. Since the accuracy associated with estimating the position, or location, of a mobile device 102 as a consequence of localization is not absolute, but rather is subject to the statistical, or probabilistic, nature of the fingerprint parameters, including but not limited to the inherently probabilistic nature of wireless radio frequency signal parameters as received.

Processor 201 uses executable instructions stored in power level adjustor module 212 to continue broadcasting of the localization data packet at one of a lower and a higher broadcast power level when it is determined that the confidence level is one of above and below a threshold confidence level. In this manner, when the localization accuracy of mobile device 102 is high, then the broadcast power level is increased, so mobile device 102 may broadcast its localized position, encoded in the localization data packet being broadcast, to peer mobile devices 102*a-n* within the pedestrian area. Conversely, and beneficially, if the accuracy estimated position of mobile device 102 as localized is determined to be low, then mobile device 102 may be "quieted", or quiesced, via executable instructions stored in power level adjustor module 212 by lowering its broadcasting power level. In aggregate regard to the peer mobile devices 102*a-n* within the pedestrian area, those one or more mobile devices having localized or estimated positions with the highest accuracy are accorded the "loudest" broadcast, at the expense of the less accurately localized mobile devices of that set of peer devices 102*a-n*. Advantageously, as the less accurate mobile devices 102*a-n* are quiesced in broadcasting power, the lower power RF signals propagating within the pedestrian area result in less signal interference to those mobile devices broadcasting at the higher power level, creating a less noisy signal transmission environment that enhances the accuracy of localization for the higher power broadcasting mobile devices.

In additional variations, at least a second mobile device in the set of peer mobile devices 102*a-n* within the pedestrian area receives the localization data packet broadcast by mobile device 102, and copies the localized position including floor information encoded with the localization data packet to establish its own position. In another embodiment, the second mobile device independently performs its localization to establish its position, but then uses the localization information as received from mobile device 102 to confirm its position as localized.

Methodology

The localization data packet as broadcast by mobile devices 102*a-n* may include location (x, y) coordinate information and also include floor number information, such as for a multi-floor building of the pedestrian area. The localization data packet may further be partitioned to include preamble component including a company identifier or other identifier associated with either a standard or a proprietary formatting of the localization data packet, based upon which, for example, the information encoded in localization data packet may be correctly decoded into specific (x, y, z) coordinates to establish a position of mobile device 102 as localized within the pedestrian area. In yet another variation, localization data packet may be constituted with a total of 20 bytes of information, of which preamble component may be constituted of 8 bytes, and x-coordinate, y-coordinate and floor number each constituted of 4 bytes. In a further variation, the localization data packet is broadcast from mobile device 102 in a BLE advertising mode.

FIG. 3 illustrates an example embodiment of method 400 of localizing mobile device 102 within crowd-sourced localization system 100. In describing examples of FIG. 3, reference is made to the examples of FIGS. 1-2 for purposes of illustrating suitable components or elements for performing a step or sub-step being described.

Examples of method steps described herein relate to the use of mobile device 102 for implementing the techniques described. According to one embodiment, the techniques are performed by crowd-sourced localization logic module 105 of mobile device 102 in response to the processor 201 executing one or more sequences of software logic instructions that constitute crowd-sourced localization logic module 105. In embodiments, crowd-sourced localization logic module 105 may include the one or more sequences of instructions within sub-modules including localization data acquisition module 210, and localization accuracy module 211, and power level adjustor module 212. Such instructions may be read into memory 202 from machine-readable medium, such as memory storage devices, or downloaded into memory 202 via network communication interface 207. In executing the sequences of instructions of localization data acquisition module 210, localization accuracy module 211 and power level adjustor module 212 of crowd-sourced localization logic module 105 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions. Additionally, it is contemplated that in alternative embodiments, the techniques herein, or portions thereof, may be distributed between mobile device 102 and a remote but communicatively accessible server computing device.

At step 310, processor 201 executes instructions included in localization data acquisition module 210 to localizing a first and at least a second mobile devices of mobile devices 102*a-n* to establish respective first and at least second estimated positions within the pedestrian area in accordance with fingerprint data of the pedestrian area. The first and the at least a second mobile devices broadcast a respective localization data packet pertaining to their respective estimated positions as localized, at respective broadcast RF signal power levels, such as a BLE signal broadcast in a BLE advertising mode.

As would be appreciated by those of skill in the art, any localization, or location determination, of mobile device 102 that is based, even at least partly, on fingerprint data constituted of radio frequency (RF) signal parameters as broadcast, cannot be guaranteed with absolute certainty of 100 percent. For instance, considering a Bluetooth Low Energy (BLE) context for illustration purposes, such a BLE signal as broadcast in the 2.4 GHz radio frequency may be may be distorted and attenuated by interference from specific elements in the environment of the pedestrian area. Such signal interfering elements may include metallic surfaces bouncing the BLE signal off the surface in unexpected ways as it is unable to penetrate the material, BLE signal absorption, attenuation and distortion caused by human body mass absorbing, water, concrete, marble and brick structures and distorting BLE signal, other mobile devices 102*a-n* and other electronic devices operating in the 2.4 GHz frequency, fluorescent lighting emitting signals in the 2.4 GHz frequency, and electric power lines, for example. When the BLE signal is distorted, due to signal interference, for example, a receiving mobile device will receive a signal that does not reflect the real situation, e.g. the distance to a fingerprint data point or position might not be accurate, since the accuracy levels are affected by various sources of signal distortion and not reflective of actual (x, y) coordinate that might be determined from localization.

Processor 201 executes instructions included in localization packet broadcast module 211 to broadcast, or transmit, at a first broadcast power level, a localization data packet that includes data of the estimated position to one or more peer mobile devices within the pedestrian area. The broadcasting power level may be measured in dBM (Decibel-milliwatts) and the more, or higher, the broadcast power level, the further the BLE signal is broadcast.

In one embodiment, the localization data packet broadcast by any of mobile devices 102a-n includes location (x, y) coordinate information and floor number information, such as for a multi-floor building constituting the pedestrian area. The localization data packet may further be partitioned to include a preamble component having a company identifier or other identifier associated with either a proprietary ora standard formatting of the localization data packet, based upon which, for example, the information encoded in localization data packet may be correctly decoded into specific (x, y, z) coordinates to establish a position of mobile device 102 as localized within the pedestrian area.

At step 320, processor 201 executes instructions included in localization accuracy module 211 to determining a respective confidence level indicative of a degree of accuracy for the first and the at least a second estimated positions, given that the accuracy associated with estimating the position, or location, of a mobile device 102 as a consequence of localization is not absolute, but rather is subject to the statistical, or probabilistic, nature of the fingerprint parameters, including but not limited to the inherently probabilistic nature of wireless radio frequency signal parameters as received. In some embodiments, a degree of accuracy associated with the position estimation may be indicated by a confidence level that is determined for, and assigned in conjunction with, estimated first and second positions as localized. As a measure of the accuracy of localization of mobile device 102, the confidence level associated with the location estimate may be obtained by fusing the probabilistic results of multiple concurrent location estimates. In some embodiments, the variance in the x and y components, with respect to their mean values ($\mu_x$, $\mu_y$), can be estimated independently as:

$$\sigma_x^2 = \frac{1}{N-1} \sum (x - \mu_x)^2$$

$$\sigma_y^2 = \frac{1}{N-1} \sum (y - \mu_y)^2$$

and combined to produce the confidence level. In one embodiment, the overall confidence level can be selected as a function of the maximum standard deviation of the x-y components, as $\sigma = \max(\sigma_x, \sigma_y)$. In other embodiments, a weighted variance of the x and y, where the weights are based on the probability of each individual estimate can be used to produce the confidence estimate. When multiple trajectory-based location estimates are available, trajectories can be grouped into categories based on similarity and a probability spread/confidence can be assigned on a per-group basis. If the per-group probability/confidence level of one group significantly exceeds that of the other groups, then the confidence in the validity of that group is raised, and hence, the confidence in the location estimate increases. Conversely, if several distinct per-group probabilities are similar, then the confidence in the per-group results are reduced, leading to a lower confidence level. Thus, the estimated position comprises a probabilistic estimate expressed as a confidence level. In one embodiment, the threshold confidence level may be established using a range of from 60 to 90 percent.

Generally, in context of one or more mobile devices 102a-n collectively broadcasting and receiving broadcast BLE signals, as the variability in the BLE signals existing in the pedestrian area decreases, referred to herein as a tighter or narrower normal distribution of signal parameters, such as due to lowered levels of signal interference that result from lower broadcast power levels, the confidence level associated with the accuracy of estimated position of mobile device 102 increases.

At step 330, processor 201 of server 101 executes instructions included in broadcast power adjustor module 212 to lower broadcast signal power levels for any of mobile devices 102a-n associated with a confidence level that falls below a threshold confidence level, and to increase broadcast signal power levels for any of mobile devices 102a-n associated with a confidence level that is above the threshold confidence level. In this manner, any of mobile devices 102a-n which are localized with a high degree of accuracy in estimated positions are allowed to predominate in transmission, in terms of transmission power levels, at the expense of others of the remaining set of mobile devices 102a-n that are quiesced or relegated to lower transmission power levels.

In other variations, a predetermined budget for overall or cumulative power level in transmission signals may be set in conjunction with broadcast logic module 106 of server 101 for a given pedestrian area. As one or more of mobile devices 102a-n are adjusted to transmit at higher or highest permitted power levels, one or more remaining others of mobile devices 102a-n may be adjusted to lower or lowest transmission power levels notwithstanding the prevailing threshold confidence level, in accordance with, or to maintain, that predetermined budget. Managing a power level budget for a given crowd-sourced localization system including mobile devices 102a-n in this manner enables server 101 to control an amount of signal interference caused by the cumulative signal transmissions in total, with an intent to enhancing the quality, clarity and range of signal transmissions locally in a given pedestrian area.

In yet another variation, the broadcast power levels of one or more of mobile devices 102a-n may be adjusted based on server 101 monitoring a power state or battery depletion level of one or more of mobile devices 102a-n, with a view to placing selected mobile devices in a quiesced or shutdown state of wireless communication when respective battery depletion levels falls below a predetermined amount or level, enabling the latter mobile devices to conserve power in operation within the crowd-sourced pedestrian localization system.

In some embodiments, the lower and higher broadcast power levels may range from −100 to +20 Decibel-milliwatts (dBm), representing the BLE signal strength as measured by mobile devices 102a-n.

The estimated positions of mobile device 102 as localized may be determined as being close to a physical building feature of a multi-floor building in which no physical barriers exist between adjoining floors, such as an elevator, escalator. In the latter case transmitted RF signals originating from a mobile device on a given floor might readily leak or propagate through such physical discontinuities to an adjoining floor. To minimize the likelihood and attendant adverse effects of such undesired signal leakage, the transmission power of a transmitting mobile device 102 may be lowered by server 101 in locations proximate such building features. Additionally, it is contemplated that, at or close to certain physical landmarks within the pedestrian area or building, it may be advantageous for server 101 to lower or increase a broadcast signal power level of any transmitting ones of mobile devices 102a-n, if desired or necessary.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no specific mention of the particular combination of features. Thus, the absence of describing combinations should not preclude the inventors from claiming rights to such combinations.

What is claimed is:

1. A method of adjusting a radio frequency (RF) broadcast signal power level in a crowd-sourced mobile device localization system in a pedestrian area, the method executed in the processor of a server computing device and comprising:
   localizing a first mobile device to establish a first estimated position within the pedestrian area, and at least a second mobile devices to establish a second estimated position within the pedestrian area, the localizing being in accordance with fingerprint data of the pedestrian area, wherein the processor receives a localization data packet including the first estimated position broadcasted by the first mobile device at a first broadcast power level and another localization data packet including the second estimated position broadcasted by the at least a second broadcast device at a second broadcast power level;
   determining a confidence level for each of the first estimated position and the at least a second estimated position by fusing probabilistic results of one or more concurrent location estimates of a corresponding mobile device, the confidence level being indicative of a degree of accuracy of an estimated position of the corresponding mobile device; and
   when the confidence level for at least one of the first estimated position and the at least a second estimated position is above a threshold confidence level, providing an input to increase at least one of the first broadcast power level and the at least a second broadcast power level to the corresponding mobile device, and wherein when the confidence level for at least one of the first estimated position and the at least a second estimated position is below the threshold confidence level, providing an input to the corresponding mobile device to lower at least one of the first broadcast power level and the at least a second broadcast power level, and wherein broadcast power levels corresponding to the first mobile device and the at least a second mobile device are increased and lowered based on a power level budget for the crowd-sourced localization system including the first mobile device and the at least a second mobile device.

2. The method of claim 1 further comprising:
   upon increasing the first broadcast power level, lowering the at least a second broadcast power level based on the power level budget.

3. The method of claim 1 further comprising broadcasting the respective localization data packet in a 2.4 GHz radio frequency, wherein the localization data packet is 20 bytes.

4. The method of claim 1 wherein the localization data packet comprises location coordinate information and floor number information within the pedestrian area.

5. The method of claim 1 further comprising:
   detecting that the one of the first estimated position and the at least a second estimated position is proximate in location to one of a building physical feature and a physical landmark; and
   providing an input to perform at least one of lowering and increasing of at least one of the first broadcast power level and the at least a second broadcast power level.

6. The method of claim 1 wherein the localizing is based on at least one of an orientation, a magnetic field strength and direction, a received wireless communication signal strength, a wireless connectivity indication and a barometric pressure in accordance with the fingerprint data.

7. The method of claim 6 wherein the fingerprint data includes a time-stamp with respect to each of at least one of the orientation, the magnetic field strength and direction, the received wireless communication signal strength, the wireless connectivity indication and the barometric pressure whereby the at least one of the orientation, the magnetic field strength and direction, the received wireless signal strength, the wireless connectivity indication and the barometric pressure are correlated in accordance with respective time-stamps.

8. The method of claim 1 wherein one of increased power level and lowered power level is in a range of −100 to +20 Decibel-milliwatts (dBm).

9. The method of claim 1 wherein the estimated position comprises a probabilistic estimate expressed as a confidence level.

10. The method of claim 9 wherein the threshold confidence level indicates 60 to 90 percent probability of the estimated position being accurate.

11. A server computing system for adjusting a radio frequency (RF) broadcast signal power level in a crowd-sourced mobile device localization system in a pedestrian area, the system comprising:
   a processor; and
   a memory including instructions executable in the processor to:
   localize a first mobile device to establish a first estimated position within the pedestrian area, and at least a second mobile devices to establish a second estimated position within the pedestrian area, the localizing being in accordance with fingerprint data of the pedestrian area, wherein the processor receives a localization data packet including the first estimated position broadcasted by the first mobile device at a first broadcast power level and another localization data packet including the second estimated position broadcasted by the at least a second broadcast device at a second broadcast power level;

determine a confidence level for each of the first estimated position and the at least a second estimated position by fusing probabilistic results of one or more concurrent location estimates of a corresponding mobile device, the confidence level being indicative of a degree of accuracy of an estimated position of the corresponding mobile device; and when the confidence level for at least one of the first estimated position and the at least a second estimated position is above a threshold confidence level, providing an input to increase at least one of the first broadcast power level and the at least a second broadcast power level to the corresponding mobile device, and wherein when the confidence level for at least one of the first estimated position and the at least a second estimated position is below the threshold confidence level, providing an input to the corresponding mobile device to lower at least one of the first broadcast power level and the at least a second broadcast power level, and wherein broadcast power levels corresponding to the first mobile device and the at least a second mobile device are increased and lowered based on a power level budget for the crowd-sourced localization system including the first mobile device and the at least a second mobile device.

12. The system of claim 11 further comprising instructions executable in the processor to, upon increasing the first broadcast power level, lower the at least a second broadcast power level based on the power level budget.

13. The system of claim 11 further comprising instructions executable in the processor of the first mobile device to broadcast the respective localization data packet in a 2.4 GHz radio frequency, wherein the localization data packet is 20 bytes.

14. The system of claim 11 wherein the localization data packet comprises location coordinate information and floor number information within the pedestrian area.

15. The system of claim 11 further comprising instructions executable in the process to:

detect that the one of the first estimated position and the at least a second estimated position is proximate in location to one of a building physical feature and a physical landmark; and provide an input to perform at least one of lowering and increasing of at least one of the first broadcast power level and the at least a second broadcast power level.

16. The system of claim 11 wherein the localizing is based on at least one of an orientation, a magnetic field strength and direction, a received wireless communication signal strength, a wireless connectivity indication and a barometric pressure in conjunction with the fingerprint data.

17. The system of claim 16 wherein the fingerprint data includes a time-stamp with respect to each of at least one of the orientation, the magnetic field strength and direction, the received wireless communication signal strength, the wireless connectivity indication and the barometric pressure whereby the at least one of the orientation, the magnetic field strength and direction, the received wireless signal strength, the wireless connectivity indication and the barometric pressure are correlated in accordance with respective time-stamps.

18. The system of claim 11 wherein one of increased power level and lowered power level is in a range of −100 to +20 Decibel-milliwatts (dBm).

19. The system of claim 11 wherein the estimated position comprises a probabilistic estimate expressed as a confidence level.

20. The system of claim 19 wherein the threshold confidence level indicates 60 to 90 percent probability of the estimated position being accurate.

* * * * *